United States Patent
Kong

(10) Patent No.: US 7,873,466 B2
(45) Date of Patent: Jan. 18, 2011

(54) VOICE-CONTROLLED NAVIGATION DEVICE AND METHOD

(75) Inventor: Fang-Wei Kong, Sinying (TW)

(73) Assignee: Mitac International Corp., Taoyuan (TW)

( * ) Notice: Subject to any disclaimer, the term of this patent is extended or adjusted under 35 U.S.C. 154(b) by 0 days.

(21) Appl. No.: 12/336,942

(22) Filed: Dec. 17, 2008

(65) Prior Publication Data

US 2009/0164113 A1    Jun. 25, 2009

(30) Foreign Application Priority Data

Dec. 24, 2007    (TW)    .............................. 96149799 A

(51) Int. Cl.
*G01C 21/00*    (2006.01)
(52) U.S. Cl. ..................................................... 701/201
(58) Field of Classification Search .......... 701/201–202, 701/206–210, 211, 213; 340/995.14, 995.16
See application file for complete search history.

(56) References Cited

U.S. PATENT DOCUMENTS

| 2004/0176906 A1* | 9/2004 | Matsubara et al. | 701/200 |
| 2005/0015197 A1* | 1/2005 | Ohtsuji et al. | 701/202 |
| 2008/0021598 A1* | 1/2008 | Daude et al. | 701/1 |

* cited by examiner

*Primary Examiner*—Kim T Nguyen
(74) *Attorney, Agent, or Firm*—Egbert Law Offices PLLC

(57) ABSTRACT

A voice-controlled navigation device includes a voice control unit, a display interface, a recognition unit, and a start unit. The voice control unit receives at least one voice command, the display interface displays a menu, and the recognition unit is used for recognizing the voice command for the display interface to display at least one option. The start unit executes a navigation function according to an corresponding option of one of the at least one voice command while receiving a specific voice start command. The menu displays one or a group of different options on the menu while a different voice command is received by the voice control unit, and each of the at least one voice command corresponds to one of the at least one option displayed on the menu.

14 Claims, 6 Drawing Sheets

VOICE-CONTROLLED NAVIGATION DEVICE AND METHOD

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a voice-controlled navigation device and method, and more particularly to a navigation device being controlled via at least one voice command and then executing a navigation function when a specific voice start command is received.

2. Description of Related Art Including Information Disclosed Under 37 CFR 1.97 and 37 CFR 1.98

Currently, to manipulate voice-control software for a navigation device, such as a global positioning system (GPS), a user has to manually set a plurality of conditions and then pushes a voice command button before his voice command can be executed. The above-described procedures are complicated and troublesome, making it inconvenient and even dangerous to use the navigation device particularly when the user is driving a car. Moreover, a user needs to particularly give a specific phrase or word as a voice command so that the voice command can be recognized by the device. However, learning and remember the specific phrase or word are definitely a burden for most users.

There is a prior art voice-controlled navigation device and method. In the method, different voice commands are preset for a target. A user is requested to input a voice command for a relatively larger range, and then input a voice command for a relatively smaller range based on the previous voice command for the larger range. Finally, a display interface follows the voice command for the smaller range to display an electronic map covering the smaller range. Therefore, navigation can be performed to locate a target within the relatively smaller range, such as in a certain section along a specified road.

The above-described prior art voice-controlled navigation device and method is disadvantageous because a user can only orally input the voice commands for the larger range and the smaller range step by step for the navigation device to display an electronic map covering a small area within the relatively smaller range. In the event the user wants to know any nearby destination, such as a gas station, a hospital, or the like, the conventional voice-controlled navigation device and method would not be able to provide such function or display such destination. Further, the conventional voice-controlled navigation device and method does not allow a user to establish and store personalized destinations, such as some traffic regulations and warning signs, including but not limited to "no left turn", "speed camera location", etc., that are very often seen along roads, for use as reminders in the future during driving. Moreover, the conventional voice-controlled navigation device and method does not include a specific voice start command, according to which the execution of a navigation function starts. In addition, the conventional voice-controlled navigation device and method does not allow a user to cancel a wrongly input voice command, so as to timely input a new and correct voice command.

It is therefore tried by the inventor to develop an improved voice-controlled navigation device and method to overcome the drawbacks in the conventional voice-controlled navigation device and method.

BRIEF SUMMARY OF THE INVENTION

A primary object of the present invention is to provide a voice-controlled navigation device and method, which is controlled via at least one voice command and then executes a navigation function when a specific voice start command is received, so that consumers' demands for voice-controlled navigation devices can be satisfied and the problems found in conventional voice-controlled navigation devices can be solved.

Another object of the present invention is to provide a voice-controlled navigation device and method, which not only clearly provides destinations nearby a user's current location, but also allows the user to store personalized destination commands.

A further object of the present invention is to provide a voice-controlled navigation device and method, in which navigation is started only when a specific voice start command is given, and a wrongly input voice command can be cancelled to timely input another correct voice command.

To achieve the above and other objects, the voice-controlled navigation device according to the present invention includes a voice control unit, a display interface, a recognition unit, and a start unit. The voice control unit receives at least one voice command, the display interface displays a menu, and the recognition unit is used for recognizing the voice command for the display interface to display at least one option. The start unit executes a navigation function according to an corresponding option of one of the at least one voice command while receiving a specific voice start command. The menu displays one or a group of different options on the menu while a different voice command is received by the voice control unit, and each of the at least one voice command corresponds to one of the at least one option displayed on the menu.

To achieve the above and other objects, a voice-controlled navigation method according to the present invention includes the following steps:

(a) receiving at least one voice command via a voice control unit;

(b) displaying a menu on a display interface;

(c) recognizing the voice command by a recognition unit, so that the menu follows the voice command to display at least one option;

(d) displaying one or a group of different options on the menu while a different voice command is received by the voice control unit, wherein each of the at least one voice command corresponds to one of the at least one option displayed on the menu; and (e) executing a navigation function according to an corresponding option of one of the at least one voice command by a start unit while receiving a specific voice start command.

BRIEF DESCRIPTION OF THE SEVERAL VIEWS OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE INVENTION

Figure 1:
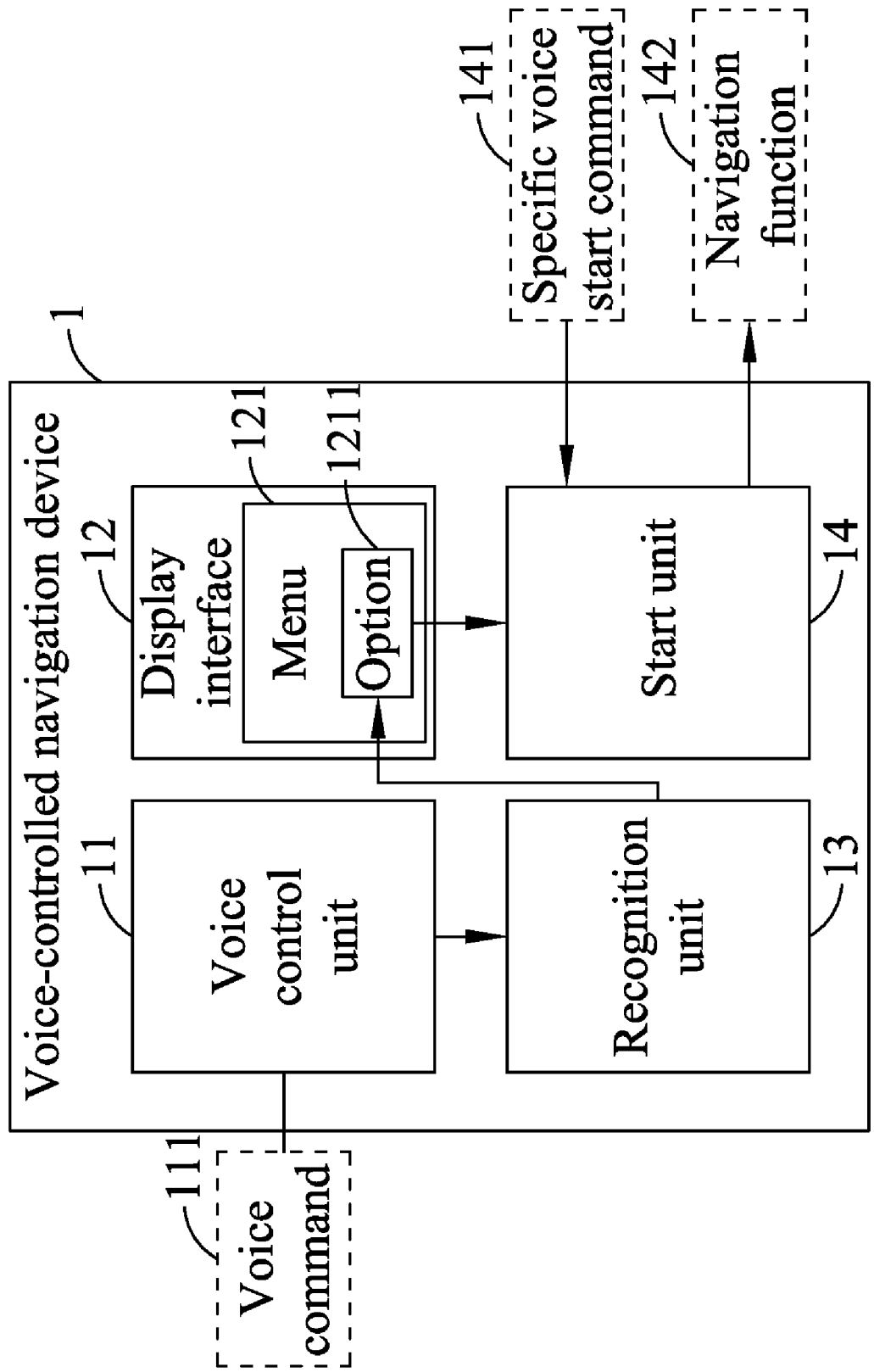
FIG. 1 is a block diagram of a voice-controlled navigation device according to a preferred embodiment of the present invention.

The present invention will now be described with some preferred embodiments thereof. For the purpose of easy to understand, like elements in the preferred embodiments are denoted by the same reference numerals.

Referring to FIG. 1, there is a block diagram of a voice-controlled navigation device 1 according to a preferred embodiment of the present invention. As shown, the voice-controlled navigation device 1 includes a voice control unit 11, a display interface 12, a recognition unit 13, and a start unit 14. The voice control unit 11 is adapted to receive at least one voice command 111. The display interface 12 is adapted to display a menu 121. The recognition unit 13 is adapted to recognize the voice command 111, so that the menu 121 follows the voice command 111 to display at least one option 1211. The start unit 14 is adapted to execute a navigation function 142 according to an option 1211 that corresponds to the voice command 111 given by a user while receiving a specific voice start command 141. The menu 121 would display one or a group of different options 1211 while receiving a different voice command 111 by the voice control unit 11. Meanwhile, each voice command 111 corresponds to one of the displayed options 1211. In the case more than one option 1211 is shown, a user needs not to particularly remember any specific phrase or word, but simply read out a desired one from the options 1211 displayed on the menu 121 to start execution of the selected option 1211.

The voice-controlled navigation device 1 may include a global positioning system (GPS), a mobile phone, or a personal digital assistant (PDA). The voice-controlled navigation device 1 further includes a storage unit (not shown). The storage unit is used for disposing a voice command database thereon, thereby enabling the recognition unit 13 to recognize the voice command 111 accordingly. The voice control unit 11 includes a receiver, the display interface 12 includes a screen, and the recognition unit 13 includes a processor and has an internal recognizing software capable of recognizing the voice command 111. Meanwhile, the voice command 111 includes a destination command, a dynamic position search command, or a personalized destination command.

When the voice command 111 input by the user is a destination command, the menu 121 would display at least one destination option and the option 1211 would be at least one distance option. The specific voice start command 141 is then given to execute a navigation function 142 corresponding to the selected distance option or to execute a cancel command.

Or, when the voice command 111 input by the user is a dynamic position search command, the option 1211 displayed on the menu 121 would be at least one destination option, and the specific voice start command 141 is given to execute a navigation function 142 corresponding to a selected destination option. And, when the voice command 111 input by the user is a personalized destination command, the option 1211 displayed on the menu 121 would be at least one traffic regulation or warning message, and the specific voice start command 141 is given to store the traffic regulation or warning message.

Figure 2A:
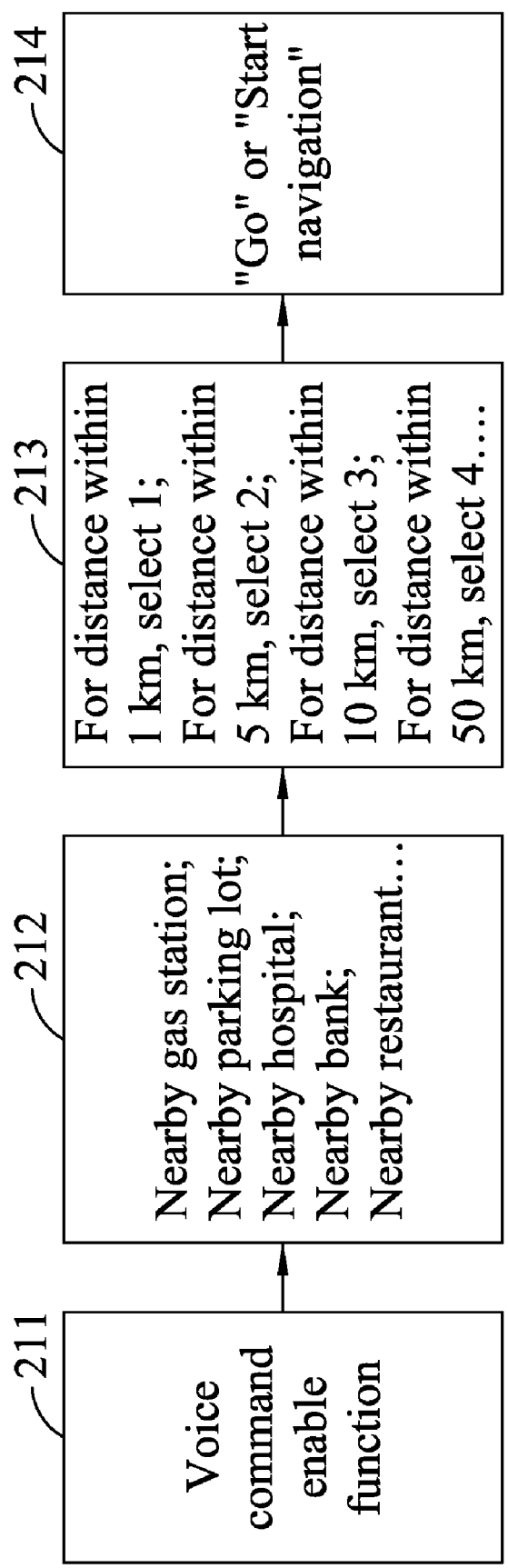
FIGS. 2(a) to 2(d) are block diagrams showing examples of using the voice-controlled navigation device of the present invention.

Referring to FIGS. 2(a) to 2(d), some examples of using the voice-controlled navigation device of the present invention are shown. As shown in FIG. 2(a), a user first orally inputs a command, such as "enable voice command", to start a voice command enable function 211. Then, the user orally inputs a destination command, such as "nearby gas station" or "nearby parking lot", etc., and the voice control unit 11 will receive the destination command and the display interface 12 will display at least one destination option 212, such as "nearby gas station", "nearby parking lot", or the like. Then, the recognition unit 13 will recognize the destination command and follow the destination command to display on the display interface 12 at least one distance option 213, such as "For distance within 1 km, select 1", "For distance within 5 km, select 2", etc., so that the user may select from the options and orally input one distance option 213. Finally, the start unit 14 receives a specific voice start command 214 orally input by the user, such as "Go" or "Start navigation", and then executes the navigation function according to the selected distance option 213.

Figure 2B:
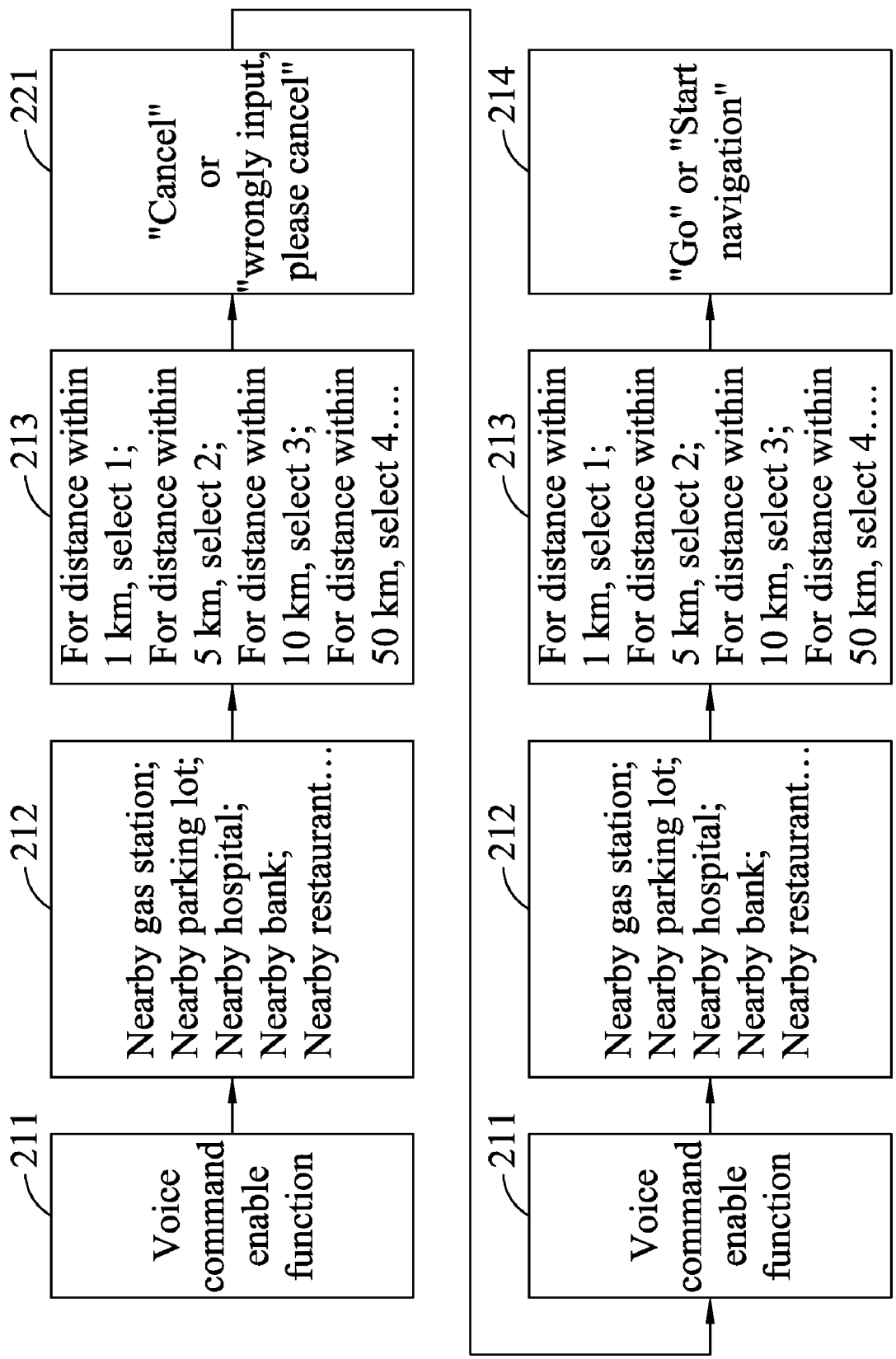

In the event a wrong destination command 212 or a wrong distance option 213 is orally input in the example shown in FIG. 2(a), the user may orally input a cancel command 221, such as "cancel" or "wrongly input, please cancel", as shown in FIG. 2(b), so that the voice-controlled navigation device 1 can re-start the voice command enable function 211 for the user to orally input a correct voice command.

Figure 2C:
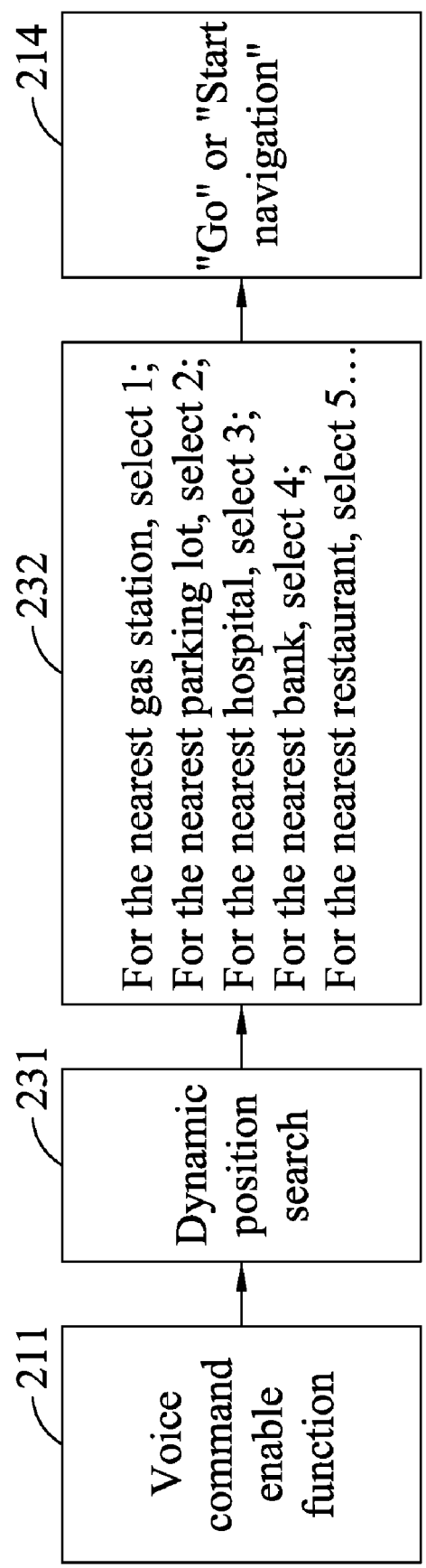

Referring to FIG. 2(c), when the user has orally input to start the voice command enable function 211, the user may further orally input a dynamic position search command 231, such as "dynamic position search". Then, the voice control unit 11 receives the command and the recognition unit 13 recognizes the dynamic position search command 231 for the display interface 12 to display at least one destination option 232 for the user to select, such as "For the nearest gas station, select 1" and so on. At this point, the user may orally input a desired destination option 232. Thereafter, the user may further orally input a specific voice start command 214, such as "Go" or "Start navigation", for the voice-controlled navigation device 1 to execute the navigation function.

Figure 2D:
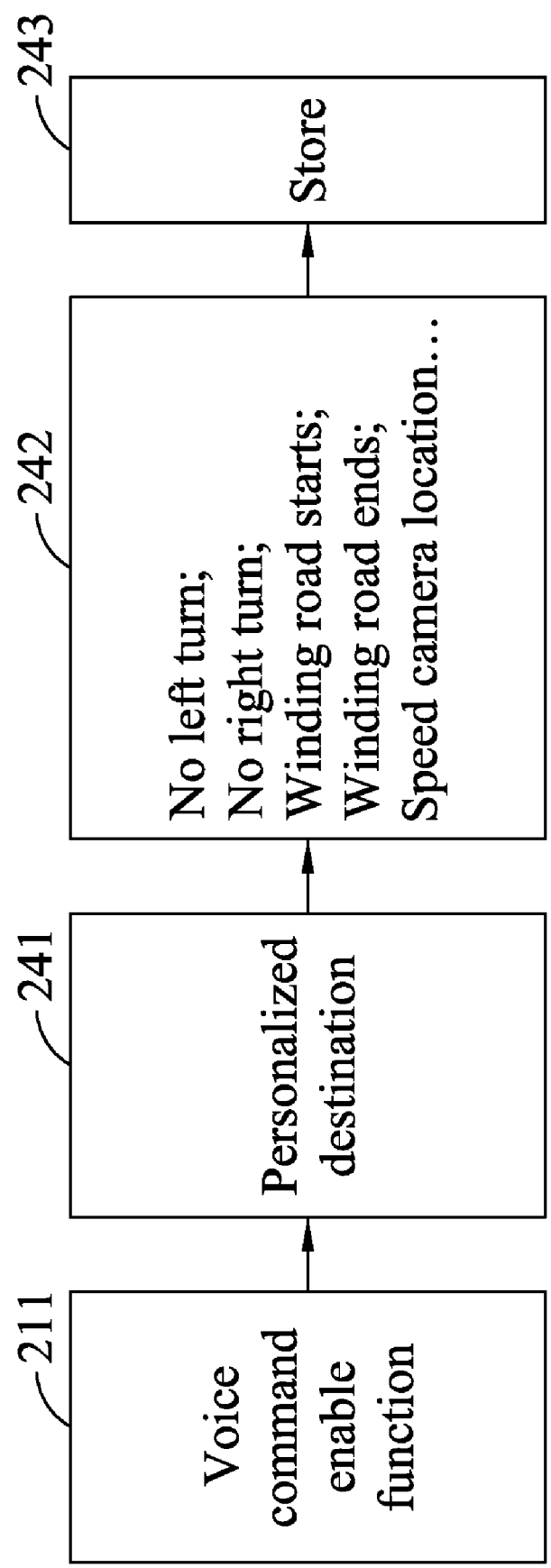

Further, as shown in FIG. 2(d), when the user has orally input to start the voice command enable function 211, the user may further orally input a personalized destination command 241, such as "personalized destination". Then, the voice control unit 11 receives the personalized destination command 241 and the recognition unit 13 recognizes the personalized destination command 241, so that the display interface 12 display at least one traffic regulation or warning message 242 for the user to select, such as "no left turn", "winding road starts", etc. At this point, the user may orally input a store command 243, such as "Store", so that the storage unit stores the traffic regulation or warning message 242 and the voice-controlled device 1 may use the stored traffic regulation or warning message in the future when executing the navigation function.

Figure 3:
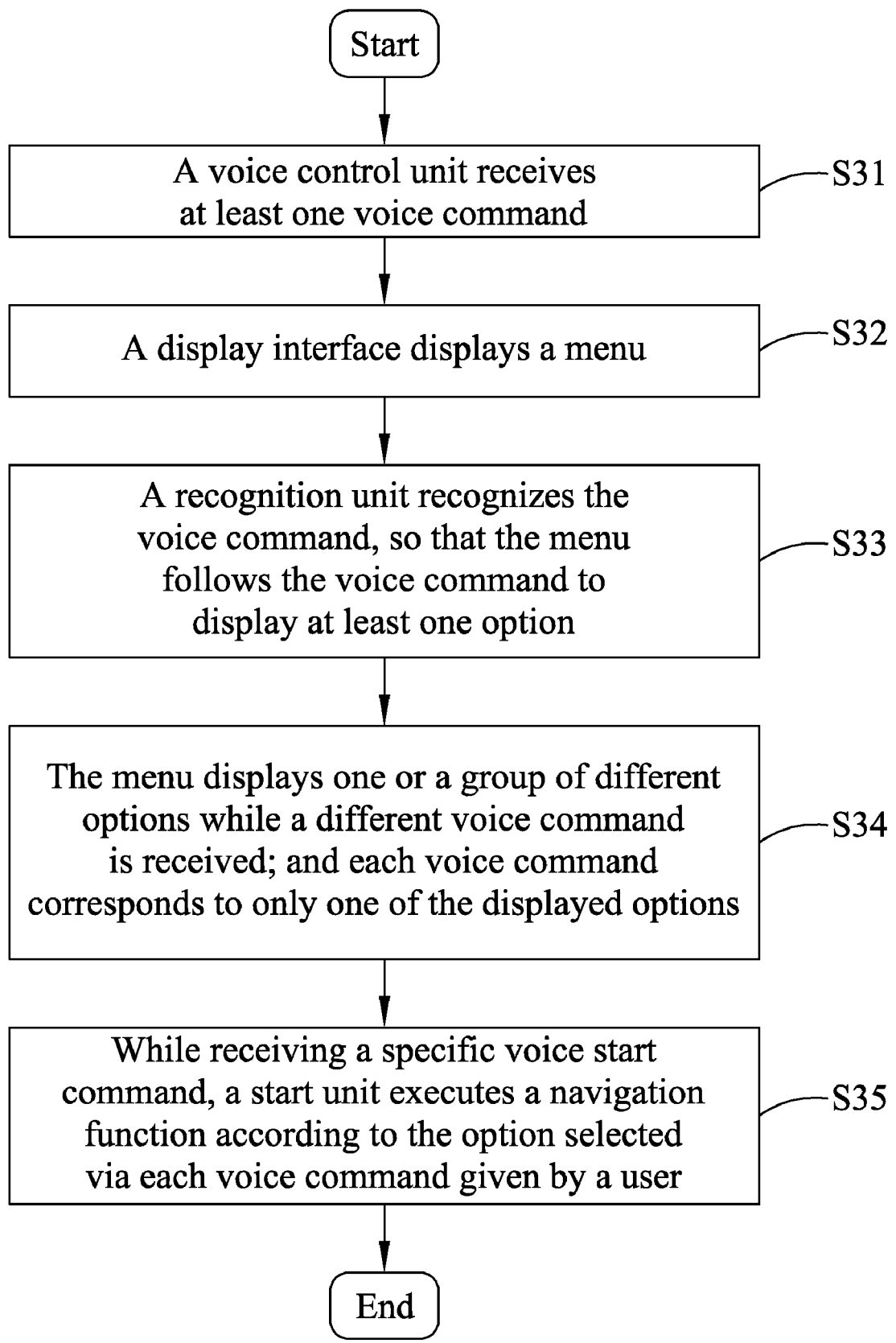
FIG. 3 is a flowchart showing the steps included in a voice-controlled navigation method according to the present invention.

FIG. 3 is a flowchart showing the steps included in a voice-controlled navigation method according to an example of the present invention. As shown, the method is implemented using the voice-controlled navigation device 1 shown in FIG. 1, and includes the following steps:

Step S31: a voice control unit 11 receives at least one voice command 111;

Step S32: a display interface 12 displays a menu 121;

Step S33: a recognition unit 13 recognizes the voice command 111, so that the menu 121 follows the voice command 111 to display at least one option 1211;

Step S34: the menu 121 displays one or a group of different options 1211 while a different voice command 111 is received; and wherein each voice command 111 corresponds to one of the displayed options 1211; when more than one option 1211 is displayed, a user needs not to particularly remember any specific phrase or word, but simply reads out a desired one from the options 1211 displayed on the menu 121, and the selected option 1211 may be executed; and Step S35: while receiving a specific voice start command 141, a start unit 14 executes a navigation function 142 according to the option 1211 selected via the voice command 111 given by the user.

The voice-controlled navigation device 1 may include a GPS, a mobile phone, or a PDA. And, the voice-controlled navigation device 1 further includes a storage unit (not shown) for disposing a voice command database thereon, thereby enabling the recognition unit 13 to recognize the voice command 111 accordingly. The voice control unit 11 includes a receiver, the display interface 12 includes a screen, and the recognition unit 13 includes a processor and has internal recognizing software capable of recognizing the voice command 111. Meanwhile, the voice command 111 may include a destination command, a dynamic position search command, or a personalized destination command.

When the voice command 111 input by the user by speech is a destination command, the menu 121 would display at least one destination option and the option 1211 would be at least one distance option. The specific voice start command 141 is then given to execute a navigation function corresponding to the selected distance option or to execute a cancel command. Or, when the voice command 111 input by the user by speech is a dynamic position search command, the option 1211 displayed on the menu 121 would be at least one destination option, and the specific voice start command 141 is given to execute a navigation function corresponding to a selected destination option. And, when the voice command 111 input by the user by speech is a personalized destination command, the option 1211 displayed on the menu 121 would be at least one traffic regulation or warning message, and the specific voice start command 141 is given to store the traffic regulation or warning message.

I claim:

1. A voice-controlled navigation device comprising:
    a voice controlling means for receiving at least one voice command;
    a display interfacing means for displaying in a first group of option in a first menu according to the voice command;
    a recognizing means for recognizing a first keyword of the first group of options from the voice command and for outputting a second group of options to a second menu on said display interfacing means according to a recognition result of the first keyword, the second group of options being a subset of the first group of options; and
    a starting means for executing a navigation function according to a second keyword of the second group of options after receiving a specific voice start command, each of the group of options being generated corresponding to the voice command and being displayed on the displaying interfacing means so as to allow users to directly read out contents or indicators of the option.

2. The voice-controlled navigation device of claim 1, being selected from the group consisting of a global positioning system, a mobile phone and a personal digital assistant.

3. The voice-controlled navigation device of claim 1, further comprising:
    a storing means for storing a voice command database therein so as to enable said recognizing means to recognize the voice command.

4. The voice-controlled navigation device of claim 1, wherein said voice controlling means comprises a receiver.

5. The voice-controlled navigation device of claim 1, wherein said display interfacing means comprises a screen.

6. The voice-controlled navigation device of claim 1, wherein the recognizing means comprises a processor and an internal recognizing software suitable for recognizing the voice command.

7. The voice-controlled navigation device of claim 1, wherein the voice command is selected from a group consisting of a destination command, a dynamic position search command, and a personalized destination command.

8. The voice-controlled navigation device of claim 1, wherein when the voice command is a destination command, the menu displays at least one destination option and the option is at least one distance option, and the specific voice start command is then given to execute a navigation function corresponding to a selected distance option or to execute a cancel command.

9. A voice-controlled navigation method comprising:
    receiving at least one voice command via a voice control unit;
    displaying a first group of options in a first menu on a display interface according to the voice command;
    recognizing a first keyword of the first group of options from the voice command;
    outputting a second group of options to a second menu on the display interface according to a recognition result of the recognizing of the first keyword, the second group of options being a subset of the first group of options, each of the groups of options being generated corresponding to the voice command and displayed on the display interface so as to allow a user to directly read out contents of indicators of each of the options; and
    executing a navigation function according to a second keyword of the second group of options by a start unit after receiving a specific voice start command.

10. The voice-controlled navigation method of claim 9, wherein the voice control unit is a receiver.

11. The voice-controlled navigation method of claim 9, wherein the display interface is a screen.

12. The voice-controlled navigation method of claim 9, wherein the step of recognizing comprising:
    recognizing the voice command by processing the voice command by internal recognizing software.

13. The voice-controlled navigation method of claim 9, wherein the voice command is selected from a group consisting of a destination command, a dynamic position search command, and a personalized destination command.

14. The voice-controlled navigation method of claim 13, wherein when the voice command is a destination command, the menu displays at least one destination option and the option is at least one distance option, and the specific voice start command is then given to execute a navigation function corresponding to a selected distance option or to execute a cancel command.

* * * * *